United States Patent
Prakash

(10) Patent No.: US 6,612,161 B1
(45) Date of Patent: Sep. 2, 2003

(54) ATOMIC FORCE MICROSCOPY MEASUREMENTS OF CONTACT RESISTANCE AND CURRENT-DEPENDENT STICTION

(75) Inventor: Shiva Prakash, Santa Barbara, CA (US)

(73) Assignee: Fidelica Microsystems, Inc., Milpitas, CA (US)

( * ) Notice: Subject to any disclaimer, the term of this patent is extended or adjusted under 35 U.S.C. 154(b) by 0 days.

(21) Appl. No.: 10/202,439

(22) Filed: Jul. 23, 2002

(51) Int. Cl.⁷ ............................................. G01N 27/00
(52) U.S. Cl. ........................................ 73/105; 73/827
(58) Field of Search ............................. 73/105, 150 A, 73/827, 834, 866; 324/691, 713, 715, 722, 723; 250/306, 307

(56) References Cited

U.S. PATENT DOCUMENTS

| | | | |
|---|---|---|---|
| 5,723,981 A | 3/1998 | Hellemans et al. ......... | 324/719 |
| 5,763,768 A | * 6/1998 | Henderson et al. ........... | 73/105 |
| 5,992,226 A | * 11/1999 | Green et al. .................. | 73/105 |

OTHER PUBLICATIONS

De Wolf, et al. "Lateral and vertical dopant profiling in semiconductors by atomic force microscopy using conducting tops"(J. Vac. Sci. Tech. A 13(3), May/Jun. 1995, pp. 1699–1704.

* cited by examiner

Primary Examiner—Robert Raevis
(74) Attorney, Agent, or Firm—Pillsbury Winthrop LLP

(57) ABSTRACT

A modified atomic force microscope (AFM) is used to perform contact resistance and/or current-dependent stiction measurements for conductive thin films at controlled values of applied force. The measurements are preferably performed under conditions approximating the operation of the thin films as electrodes in microswitch array fingerprint sensors. A first, planar thin film is contacted with a second, curved thin film deposited over a round ball having a diameter of a few microns to a few tens of microns. The second film is preferably a coating deposited over the ball and over the arm controlling the ball motion. The coating deposited over the arm provides an electrically conductive path to the contact surface of the ball.

22 Claims, 4 Drawing Sheets

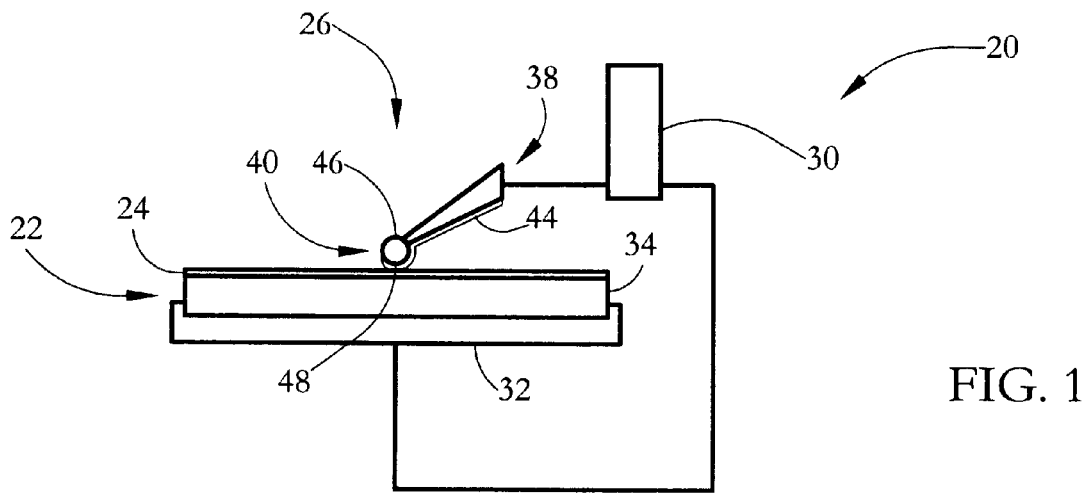
FIG. 1
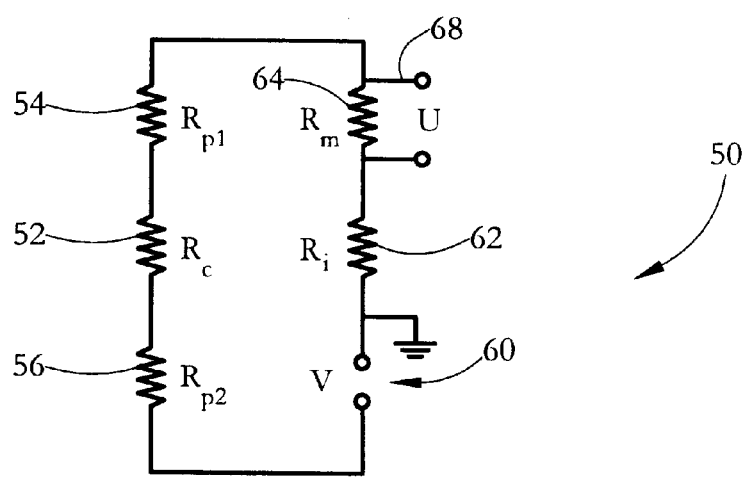
FIG. 1-B

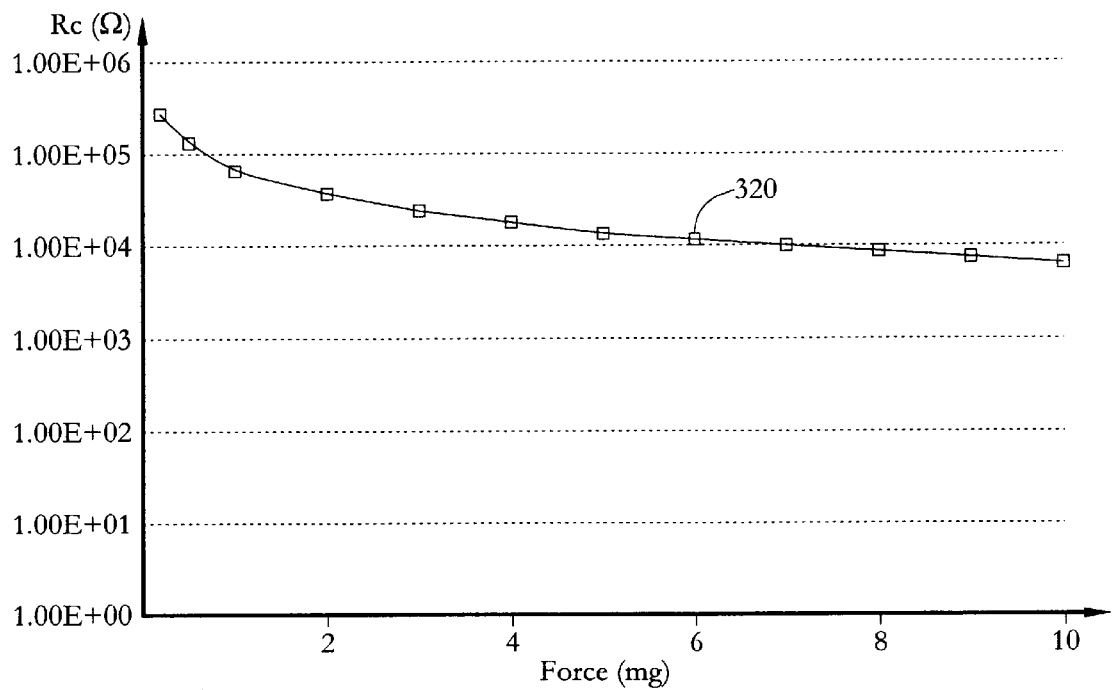
FIG. 3-A
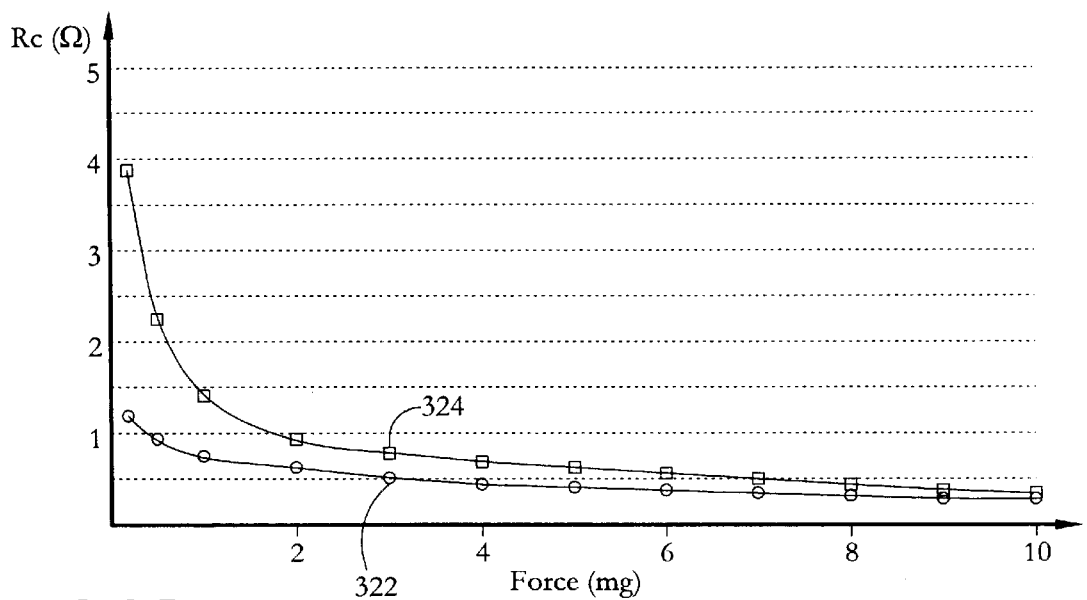
FIG. 3-B

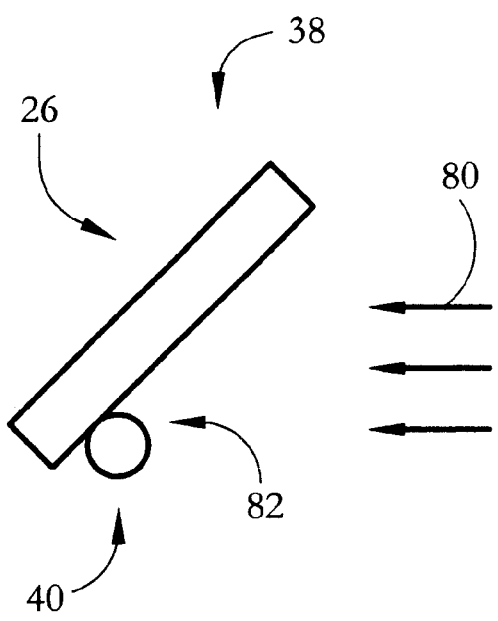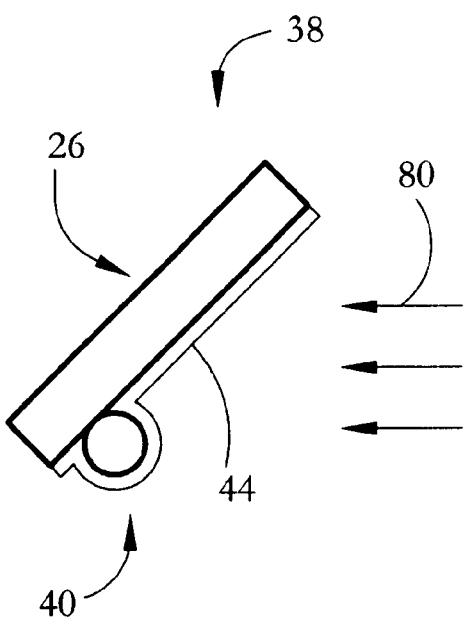
FIG. 5-A  FIG. 5-B

ATOMIC FORCE MICROSCOPY MEASUREMENTS OF CONTACT RESISTANCE AND CURRENT-DEPENDENT STICTION

RELATED APPLICATION DATA

This application is related to U.S. patent application Ser. No. 09/571,765 filed May 18, 2000 entitled "Method and Apparatus for Pressure Sensing," and U.S. patent application Ser. No. 10/038,505 filed Dec. 20, 2001 entitled "Fingerprint Sensors using Membrane Switch Arrays."

FIELD OF THE INVENTION

The invention relates to systems and methods for measuring contact resistance and/or stiction, and in particular to methods of evaluating contact materials for microswitches such as fingerprint sensor switches.

BACKGROUND OF THE INVENTION

The fingerprint sensing industry uses several different conventional technologies to capture images of an individual's fingerprints. Two prominent technologies are optical-based sensors and capacitance-based sensors. In a typical optical sensor, a light source, lenses and a prism are used to image the ridges and valleys on a fingerprint, based on differences in the reflected light from the features. Conventional capacitance sensors include two-dimensional array of capacitors defined on a silicon chip, and fabricated by semiconductor CMOS processing. The individual sensors on the chip form one plate of the parallel plate capacitor, while the finger itself, when placed on the array, acts as the second plate for the various localized sensors. Upon contact with the array of sensors, the individual distance from each sensor to the corresponding point on the skin above the sensor is measured using capacitive techniques. The difference in distance to skin at the ridges and valleys of a fingerprint identifies the fingerprint.

Capacitive and optical sensors can be sensitive to oils or grease on the finger and to the presence or absence of moisture on the finger. In addition, the ambient temperature can affect these sensors at the time of sensing. Under hot or cold conditions, capacitive sensors can provide erroneous readings. Finally, most sensors have abrasion resistant coatings. The thickness of the protective coating can affect the measurements. The combined effect of these variables can result in distorted fingerprint images. Finally, in the case of silicon chip based fingerprint sensors, the placement of the finger directly onto the silicon increases the risk of electrostatic discharge and damage to the sensor.

The above-referenced U.S. patent application Ser. Nos. 09/571,765 and 10/038,505 describe systems and methods for performing texture (e.g. fingerprint) measurements using switch arrays. A fingerprint sensor for performing such measurements can include tens of thousands of miniature switches arranged in an x-y array. Each switch includes a lower electrode, and an upper electrode disposed over the lower electrode. Depending on the force applied on the switch, the upper electrode can be separated from the lower electrode, or can establish electrical contact with the lower electrode. The state (open or closed) of each switch indicates whether a fingerprint ridge or valley is positioned above that switch. A map showing the distribution of switch states over the sensor area can thus be used to identify a fingerprint positioned over the sensor.

In a representative implementation of such a fingerprint sensor, each switch extends over a few tens of $\mu$m along the x- and y-directions, and is capable of changing state upon the application of a load corresponding to a few mg of mass. Such a switch can include upper and lower electrodes formed by thin films having thicknesses on the order of tenths of micron to a few microns. The performance of such a switch can depend to a significant extent on the properties of the thin films defining the electrodes. Systems and methods for systematically evaluating such thin films could be of great benefit to the design of more accurate and reliable switches for texture sensing and other applications.

SUMMARY OF THE INVENTION

The present invention provides systems and methods for performing measurements that are useful in determining materials that are useable for various applications and particularly contact materials useable for switches of different types, and more particularly for microswitches, using an atomic force microscopy measurement. A measurement or measurements, for instance of contact resistance between a pair of opposing thin films, is performed at a first controlled applied force value between the thin films. Each of the thin films is formed by a material being considered for use in the application, switch or microswitch of interest. A subsequent atomic force microscopy measurement is used to obtain a current-dependent stiction force value between the thin films. The contact resistance, the stiction force, or other measurement values, either separately or in combination, are employed to determine materials that are suitable for the application, and particularly contact materials that will contact each other in switches or microswitches. Of particular interest is measuring characteristics of thin film materials.

In one aspect of the invention to perform the measurements, a first film of a first contact material is disposed on a planar substrate. A second film of a second contact material is disposed on a rounded piece. The radius of curvature of the rounded piece along a contact surface between the first film and the second film is preferably higher than 10 $\mu$m and lower than 100 $\mu$m. Measurements between the first film and the second film are then performed at a controlled applied force value between the first thin film and the second thin film, preferably not exceeding 1 milliNewton (mN).

Other aspects and advantages of the present invention will become apparent hereinafter.

BRIEF DESCRIPTION OF THE DRAWINGS

The foregoing aspects and advantages of the present invention will become better understood upon reading the following detailed description and upon reference to the drawings where:

FIG. 1 is a schematic diagram of a modified atomic force microscopy apparatus for performing contact resistance and/or stiction measurements, according to the preferred embodiment of the present invention.

FIG. 1-B is a schematic diagram of a contact resistance measurement circuit according to an embodiment of the present invention.

FIGS. 3-A and 3-B show computed contact resistance values for Ru-Mo contact surfaces, according to an embodiment of the present invention.

FIGS. 5-A and 5-B are side view illustrations of the deposition of a conductive film on a movable member, before and after the deposition, respectively, according to an embodiment of the present invention.

DETAILED DESCRIPTION OF THE INVENTION

Figure 2:
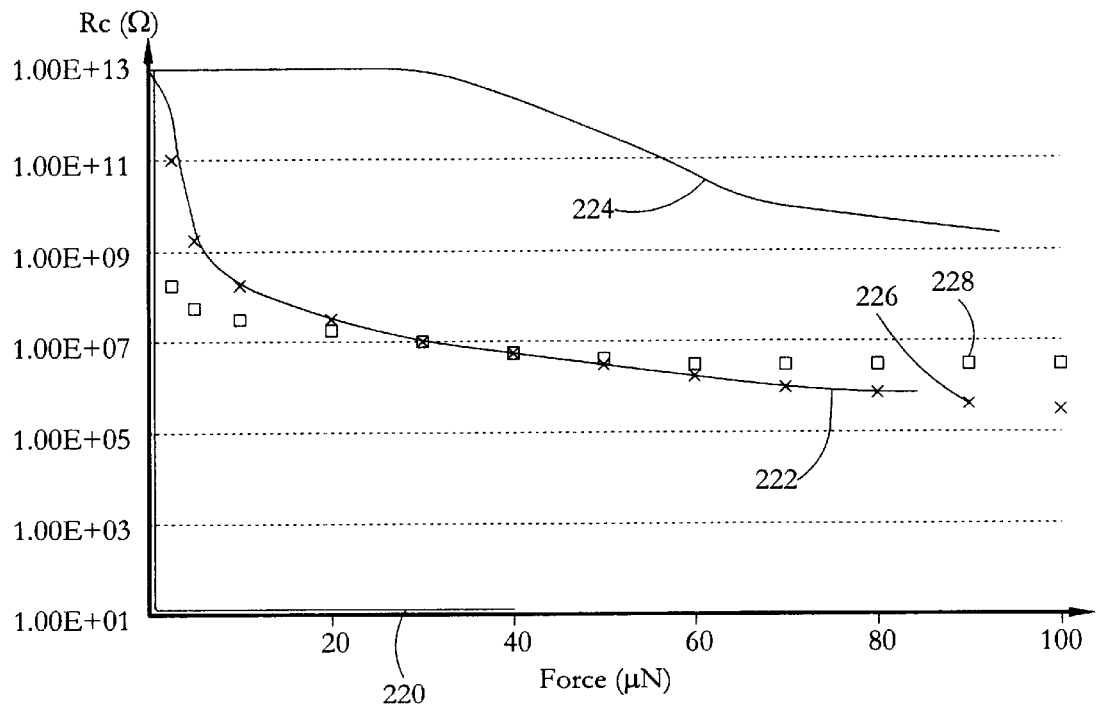
FIG. 2 shows measured and computed contact resistance values for several thin films, according to an embodiment of the present invention.

In the following description, it is understood that each recited element or structure can be formed by or be part of a monolithic structure, or be formed from multiple distinct structures. An electrically-dependent or current-dependent stiction force value is a value of a stiction force between two surfaces measured after or during a passage of electrical current through the contact interface between the two surfaces. Unless explicitly specified otherwise, a thin film is understood to be a film having a thickness of less than about 1 micron. The term "material" is understood to encompass composite and/or alloy structures comprising multiple chemical elements or compositions. The terms "upper" and "lower" are used to describe relative positions, and do not necessarily refer to the direction of gravity. A set of elements is understood to include one or more elements. A plurality of elements is understood to include two or more elements. Any recitation of an element is understood to refer to at least one element. Unless specified otherwise, any recitation of a first element and a second element (e.g. first and second applied forces) is understood to allow for a first element equal to the second element. For example, a first material of a pair of contact materials need not be necessarily different from a second material of the pair of contact materials.

The following description illustrates aspects of the invention by way of example and not necessarily by way of limitation.

The design of microswitches used for fingerprint recognition and other applications would benefit from systematic methods of evaluating the thin metal films that define the contact surfaces, at contact force values and electrical current conditions corresponding to the operating conditions of the switches. Parameters of particular interest for the operation of such switches are contact resistance and stiction. Selecting electrode materials with low contact resistance and stiction forces facilitates discriminating between the open and closed states of the switches, and reduces the likelihood that switches remain permanently closed. Microswitch applications where such contact material evaluation techniques would be of benefit include communications, power electronics, indicators and instrumentation, industrial automation, automotive applications, and applications involving extreme operating conditions, such as space and defense applications.

The importance of providing low contact resistance and low contact stiction increases as the microswitches are miniaturized to ever-smaller sizes, and operate at smaller forces. For micro-switches, the force with which surfaces mate can be in the microNewton to milliNewton range. For clean surfaces in Asperity contact, the asperities along the surfaces constrain the flow of current, thus creating contact resistance. Contamination along the contact surfaces can introduce an additional resistance at the contact interface. Current-dependent stiction is the force with which two mating surfaces are held, due to micowelding, after the application of force and current. Stiction can occur even in the absence of current flow, due to mechanical alloying resulting from applied force. The stiction effect is significantly more pronounced with the passage of current, as the passing current induces heating of asperities along the contact interface and promotes micro-welding. If the stiction force exceeds the restoring force of the micro-switch, the micro-switch can become permanently closed or stuck, and can thus stop functioning. As switches are miniaturized, their restoring forces often decrease, and their vulnerability to stiction-induced failure increases.

Both contact resistance and stiction forces are strongly dependent on the geometry of contact. To simulate real contacts, the evaluation method ideally reproduce the real microswitch, geometry. For fingerprint sensors, for example, where contact is between a flat surface (typically the flat lower electrode) and a slightly rounded surface (typically the flexing upper electrode), and the contact area is sub-micron in spatial dimension, sharp probes or macroscopically large probes would not yield accurate results reflecting the operation of the microswitch. The preferred embodiment of this invention aims to better reproduce the geometry of real microswitches, as well as provide accurate and convenient ways of measuring contact resistance and stiction.

Consider a typical load applied by an individual's finger on a microswitch array sensor, as described in further detail in the above-referenced U.S. patent application Ser. No. 10/038,505. Consider an applied load in the range of 100–500 grams, a fingerprint approximately 15 mm×15 mm in general diameter, and an array of switches with total dimensions of 15 mm×15 mm. The spacing between typical fingerprint ridges is on the order of 400 $\mu$m. If the switches are placed 50 $\mu$m apart on a two dimensional x-y grid, an array of on the order of 300×300 switches would be suitable for covering a sensor, surface area of 15 mm×15 mm. There are a total of 90,000 sensors in such an array, and the applied load from the fingertip can be assumed for simplicity to be distributed over these 90,000 sensors. As a first order approximation, one can assume that the area of the ridges is equal to that of the valleys. Thus, approximately 45,000 sensors bear the applied load. If one conservatively assumes an applied load of 90 grams from the fingerprint, then each cell bears an approximate load of about 2 mg. Such a load corresponds approximately to an applied force on the order of tens of microNewtons ($\mu$N), e.g. 10–30 $\mu$N.

FIG. 1 shows a schematic side view of a contact resistance and stiction measurement apparatus 20 according to the preferred embodiment of the present invention. Apparatus 20 is preferably a modified atomic force microscope (AFM). Apparatus 20 can be made by performing modifications as described below on a commercially available AFM, such as a Veeco/Digital Instruments Dimension-series AFM. Apparatus 20 is capable of performing contact resistance measurements, stiction measurements, and/or other measurements over length scales in the micron and submicron ranges. In particular, the contact area defined by apparatus 20 can have an in-plane extent of microns to fractions of a micron. Apparatus 20 is also preferably capable of generating and measuring controlled applied forces and changes in applied forces in the range of microNewtons to tens of microNewtons.

Apparatus 20 comprises a fixed support 22, a thin film conductive sample 24 mounted on support 22, and a rounded surface, conductive movable upper member 26 capable of contacting sample 24. Conductive sample 24 is preferably a thin metal/alloy film having a thickness of hundreds to thousands of Ångstroms. Exemplary materials for sample 24 include, without limitation, gold, chromium, molybdenum, ruthenium, iridium, indium tin oxide (ITO), platinum, palladium, or any other conductive material to be evaluated. The thickness and surface properties/treatment of sample 24 preferably correspond to the actual thickness and surface properties of at least one of the contact films to be used in the microswitches of interest, such that the data measured for sample 24 is indicative of the properties of the film(s) to be used in the microswitches of interest. Sample 24 can be a multilayer film, e.g. a bilayer film. Such a multilayer layer can include a conductive outer layer, and an inner layer or layers formed by conductive or insulative materials such as metals, polymers, or other desired materials.

Apparatus 20 further comprises control/acquisition components 30 electrically and mechanically connected to sample 24 and member 26. Control/acquisition components 30 include mechanical and electronic control components for controlling the relative positions of sample 24 and member 26. Control/acquisition components 30 further include acquisition electronics for acquiring data indicative of contact resistance and stiction values between sample 24 and member 26. The acquisition electronics preferably include a voltage or current measurement unit for determining the current passing between sample 24 and member 26 and/or other data indicative of the contact resistance between sample 24 and member 26. The acquisition electronics preferably also include a force setpoint indicator for measuring the applied force applied between sample 24 and member 26. In particular, the force setpoint indicator is used to record the force applied to member 26 at a timepoint during a retraction of member 26 when the current between sample 24 and member 26 drops to zero, which will occur when the sample 24 and the member 26 are no longer in contact, as described in further detail below.

Support 22 preferably comprises a conventional fixed AFM chuck 32, and a sample substrate 34 mounted on chuck 32. Substrate 34 is preferably a silicon or glass substrate having a thickness of about 100 to 1000 microns, on which conductive sample 24 is deposited. Substrate 34 may include a conductive layer deposited onto a glass or silicon support, in contact with sample 24. Such a substrate conductive layer may be used to reduce the parasitic resistance of the measurement circuit, as illustrated below. The upper surface of sample 24, opposite substrate 34, forms a contact surface for contacting upper member 26.

Upper member 26 comprises an elongated rigid cantilever arm 38, and a rounded end piece 40 mounted at the distal end of arm 38. A conductive coating (sample) 44 extends over end piece 40 and arm 38, for providing an electrical conduction path from the proximal end of arm 38 to a contact surface defined along end piece 40. Conductive coating 44 is preferably formed by a material of interest to be evaluated in contact resistance and/or stiction measurements to be performed with apparatus 20. Such a material may include, without limitation, gold, chromium, molybdenum, ruthenium, iridium, indium tin oxide (ITO), platinum, palladium, or any other conductive material to be evaluated. Coating 44 can be formed by a multilayer-film, as discussed above with reference to sample 24. Coating 44 can be a bi-layer including, for example, an inner layer providing a low resistance to current flow, and an outer layer formed of the material of interest. The inner layer can serve to reduce the parasitic resistance of the measurement circuit. Coating 44 can be identical in composition to sample 24. Coating 44 preferably has a thickness of hundreds to thousands of Ångstroms.

The proximal end of arm 38 is connected to control/acquisition components 30. Control/acquisition components 30 control a linear, vertical motion of arm 38. Controlling the position and motion of arm 38 allows controlling the contact force applied by end piece 40 to the contact surface of conductive sample 24. The inner part of arm 38 is preferably made of stainless steel or another rigid composition. The general shape (major axis) of arm 38 can make an acute angle, e.g. about 10–15°, with the horizontal direction.

End piece 40 is preferably a smooth, spherical ball having a diameter of 10–100 $\mu$m, in particular about 40–60 $\mu$m, for example about 50 $\mu$m. In general, balls having diameters or radii of curvature of between as low as 1 $\mu$m and as high as 500 $\mu$m may also be used. The geometry of a sphere contacting a flat surface is well suited to using the Hertz equations of contact mechanics. The Hertz equations, in combination with contact resistance theory, can be used to quantitatively analyze the contact resistance properties of the materials and switches of interest. Furthermore, a spherical (Hertzian) shape for end piece 40 can allow simplifying the theoretical characterization of the contact surface. End piece 40 preferably comprises an inner core 46, and the part of conductive coating 44 disposed over inner core 46. Inner core 46 is preferably made of a hard material such as tungsten, titanium, or silica. The part of conductive coating 44 disposed over the lower part of inner core 46 defines a rounded, preferably spherically-curved, contact surface 48 capable of contacting sample 24. As described above, conductive coating 44 preferably extends over a large enough area of upper member 26 so as to provide an electrically-conductive path between contact surface 44 and the acquisition electronics of control/acquisition components 30.

As is apparent, it is the shape of end piece 40 along contact surface 48, rather than the overall size of end piece 40, that primarily determines the contact resistance characteristics of end piece 40. Consequently, end pieces that are not generally spherical or rounded, but have rounded (e.g. spherical, cylindrical, ellipsoidal, etc.) contact surfaces may be used. The relevant parameter for such an end piece is the radius of curvature along the contact surface, rather than the overall size of the end piece. For a 60 $\mu$m spherical ball, the radius of curvature along the contact surface is 30 $\mu$m. For a rounded, non-spherical end piece, the radius of curvature along the contact surface may vary within a range.

End piece 40 is preferably attached to arm 38 by a non-conductive conventional epoxy. Alternatively, end piece 40 may be attached to arm 38 using a conductive epoxy such as silver epoxy, other types of adhesives, or mechanical fasteners. It was empirically observed that commercially available conductive epoxies such as silver epoxy have poorer adhesive properties than available non-conductive epoxies. Such conductive epoxies may also introduce relatively high resistances in the conductive path between the contact surface and the acquisition electronics. Moreover, core 46 and arm 38 may include native surface oxides, whose resistances may be significant even if the resistance of a conductive epoxy is relatively low. Thus, applying an external conductive coating to member 26 may be desirable even if a conductive epoxy were used to attach end piece 40 to arm 38.

To perform measurements of the contact resistance between lower sample 24 and upper sample 44, upper member 26 is lowered until end piece 40 contacts sample 24. The position of end piece 40 is then controlled to apply desired forces to sample 24. Preferably, the applied forces are between microNewtons to milliNewtons, and in particular on the order of tens of microNewtons. The applied force is preferably controlled with an accuracy on the order of microNewtons to tens of microNewtons. Generally, the applied forces hare selected according to the force expected to be applied to the microswitch of interest during the operation of the microswitch. For example, the applied forces can be selected to be in a range centered around an average applied force expected during the operation of the microswitch. The magnitude of the applied force is measured using conventional AFM components of control/acquisition components 30. The acquisition electronics of control/acquisition components 30 are used to record electrical parameter (e.g. voltage or current) values indicative of the contact resistance between end piece 40 and sample 24 at various values of applied force between end piece 40 and sample 24. Contact resistance values are then computed from the recorded electrical parameter values.

FIG. 1-B shows a schematic illustration of an exemplary contact resistance detection circuit 50 according to an embodiment of the present invention. Circuit 50 includes several resistances arranged in series outside of the acquisition electronics of apparatus 20, as described below. A contact resistance 52 ($R_c$) is the resistance introduced by the interface between samples 24, 44. A first parasitic resistance 54 ($R_{p1}$) is the resistance of upper member 26 and the other part of the electrical path between contact surface 48 and the acquisition electronics. A second parasitic resistance 56 ($R_{p2}$) is the resistance of sample 24 and the other part of the electrical path between sample 24 and the acquisition electronics. The parasitic resistances 54 and 56 can be thought of as an equivalent, single parasitic resistance $R_p$ incorporating all the parasitic resistances of circuit 50. In typical present applications, the parasitic resistance of circuit 50 can vary from less than one ohm to several ohms. The parasitic resistance can depend on film resistivity, thickness, structure (e.g. bilayer or multilayer), and other parameters.

The parasitic resistances 54, 56 can be determined empirically in a calibration measurement. Such a calibration measurement can be taken using the system described above at a high applied force, or by using external probes. The force used in the calibration measurement is preferably at least about an order of magnitude higher than the force used for the contact resistance measurements. For example, for contact resistance measurement forces in the range of 1–50 microNewtons, a calibration applied force of at least about 500 microNewtons is preferably used. A cantilever arm having a high enough spring constant to permit the application of such forces is then used. A calibration measurement can also be performed by using thick gold films along the contact surface, or by using bi-layer films. A parasitic resistance calibration measurement may not be needed for performing measurements of changes in contact resistance as a function of applied force, since the parasitic resistance of the circuit should not change with applied force. The calibration measurement is used to obtain an precise value of the resistances in the measurement circuit, including leads, equipment internal resistances, external resistances etc., since the present invention measures such small and accurate values of contact resistance. This high force is in the calibration measurement to essentially ensure perfect contact and, therefore, near zero contact resistance, at which point isolation of the rest of the measurement circuit resistances can occur.

Circuit 50 further includes several components which are part of the acquisition electronics of apparatus 20. A constant voltage source 60 has one terminal connected to sample 24, and the other terminal connected to ground. Voltage source 60 preferably generates a DC voltage, preferably between 0 and 5 V. In a present implementation, voltage source 60 is a 3.5 V d.c. power supply. The internal resistance $R_i$ of voltage source 60 is shown at 62. In a present implementation, internal resistance 62 is 1100Ω. A voltage meter 68 is connected across a high, known measurement resistance 64. Measurement resistance 64 is connected between upper member 26 and the ground terminal of voltage source 60. Measurement resistance 64 is preferably equal to the equivalent resistance of the rest of circuit 50.

For the measurement circuit shown in FIG. 2, the contact resistance $R_c$ between sample 24 and sample 44 is $$R_c = R_m\left(\frac{V}{U} - \frac{R_m + R_i}{R_m}\right) - R_p, \qquad [1]$$

where U is the voltage measured by voltage meter 68, and $R_p$ is the total parasitic resistance $R_p = R_{p1} + R_{p2}$. For the resistance values in the implementation described above, the resolution achieved with circuit 50 is on the order of a few ohms. The sensitivity of the measured voltage U across $R_m$ is highest when $R_m$ is matched (or equal) to $R_i$, assuming $R_i >> (R_c + R_p)$. Improved resolutions can be achieved by using different measurement circuits, such as for example a current-measuring circuit including a logarithmic current amplifier.

FIG. 2 illustrates exemplary contact resistance data taken using the apparatus described for one Au—Au and two Au—Cr contact surfaces, and computed contact resistance data generated using a tunneling model. Curves 220, 222 and 224 show the measured Au—Au, Au—Cr, and Au-etched Cr data, respectively. The star-shaped data points illustrated at 226 were computed using electron tunneling theory assuming a work function that varies with applied force, to enable a match to the data. The square shaped data points shown at 228 were computed for a fixed work function and fixed film thickness. A gold-coated tip and gold-coated silicon substrate were used for the gold-on-gold measurements. A gold-coated tip and chromium-coated silicon substrate were used for the gold-on-chromium measurements. The gold films were deposited as described in detail below. A physical vapor deposition (PVD) process was used to deposit the two chromium films.

No oxide formed on the gold films. Consequently, the contact resistance at the Au—Au film interface was relatively low and independent of applied force. The Cr film corresponding to the curve labeled "Au-etched Cr" was etched after deposition by dipping into an acetic acid/hydrogen peroxide mix. The etching process resulted in the formation of a relatively thick (about 2 nm) oxide layer on the Cr film surface. Consequently, the contact resistance as a function of applied force stayed relatively high, and decreased only for applied force values above 20 $\mu$N. The Cr film corresponding to the curve labeled "Au—Cr" was exposed to air but not etched, and had a thinner oxide film. The contact resistance for the Au—Cr interface decreased rapidly for applied forces under 10–20 $\mu$N.

FIG. 3-A shows computed contact resistance data 320 as a function of applied load for a Ru—Mo interface, with RuOx and MoOx contamination (oxide films) on the metal surfaces. FIG. 3-B shows computed contact resistance data as a function of applied load for a Ru—Mo interface having no contamination and RuOx contamination only, respectively. Curve 322 shows data for no surface contamination, while curve 324 shows data for RuOx contamination only. The data was computed for a contact surface defined at the interface between a sphere and a planar film, using the Hertz equations and the theory of contact resistance. For further information on contact resistance theory see for example R. Holm, "Electrical Contacts: Theory and Application," New York, Springer-Verlag, 1967.

Referring back to FIG. 1-A, apparatus 20 can also be used to perform measurements of electrically-dependent (current-dependent) contact stiction forces on samples of interest. When two surfaces come into intimate contact, the two surfaces can become attached to each other. The stiction phenomenon can be thought of as microwelding or cold welding caused by formation of bonds between atoms along the two surfaces. The stiction force between the two samples is the force required to separate the samples after the samples are brought into contact using an applied force. The microwelding phenomenon and the associated stiction force can depend on the passage of current through the contact surface. The passage of electrical current can cause localized heating of the samples along the contact surface, thus enhancing the microwelding process and increasing the stiction force. For example, such localized heating can lead to melting of sample microasperities along the contact surface.

To perform a measurement of a current-dependent stiction force, upper member 26 is lowered until ball 40 contacts sample 24 and applies a desired level of downward force to sample 24. A desired stiction modulation voltage is applied using voltage source 60, such that a controlled amount of current passes through the contact interface between samples 24, 44. The stiction modulation voltage is preferably chosen such that the current passing through the contact interface between samples 24, 44 is equal to or similar in magnitude (e.g. within a factor of ten) of the current expected during an operation of a microswitch of interest. The current is preferably between 5 $\mu$A and 5 mA, for example between 5 $\mu$A and 100 $\mu$A. Higher currents, on the order of mA, may be used to simulate short-circuits or other atypical operating conditions that may occur for example if the switch is subjected to shocks. In a present implementation using the detection circuit 1-B, the stiction modulation voltage applied using voltage source 60 is about 5 V.

An increasing upward force is then applied to upper member 26. If desired, to prevent arcing between samples 24, 44 when samples 24, 44 become separated, the voltage applied by voltage source 60 can be reduced to a stiction-measurement value before the upward force is applied to upper member 26. The stiction measurement value is lower than the stiction modulation value, for example at least an order of magnitude lower than the stiction modulation value. In a present implementation, the voltage applied using voltage source 60 is reduced from a stiction modulation value of about 5 V to a stiction measurement value of about 0.2 to 0.3 V.

The force required to separate member 26 from sample 24 (the stiction force) is then recorded. The stiction force is preferably measured by recording the force corresponding to a cessation of current flow between sample 24 and upper member 26, as detected by voltage meter 68. Alternatively, the stiction force can be measured using conventional mechanical (e.g. piezoelectric) components, in a manner which does not depend on the passage of current through the contact interface between samples 24, 44.

The applied force values for stiction measurements can be (but need not be) significantly larger than the applied force values for contact resistance measurements. As an illustration, for evaluating a microswitch such as a fingerprint sensor microswitch, the applied forces of interest can be forces due to shocks or impacts applied to the microswitch. If such an applied force leads to a stiction force higher than the restoring elastic force of the microswitch, the switch can remain permanently closed regardless of whether an external force is applied subsequently. In designing such a microswitch, the stiction forces resulting from expected shocks to the microswitch are ideally lower than the restoring force of the microswitch. In a present implementation, stiction force values are measured for applied forces of tens to hundreds of microNewtons. Depending on the application, suitable applied forces may range up to tens of microNewtons, 1 mN, or hundreds (e.g. 200) of milliNewtons. In general, the applied force for the stiction force measurements can be selected according to expected impact applied forces during the operation of the microswitch, for example in a range up to the maximum expected operating impact force. The applied forces and voltages for the stiction force measurements can also be selected according to the expected normal operating conditions of the switch of interest, as described above with reference to contact resistance measurements.

Figure 4:
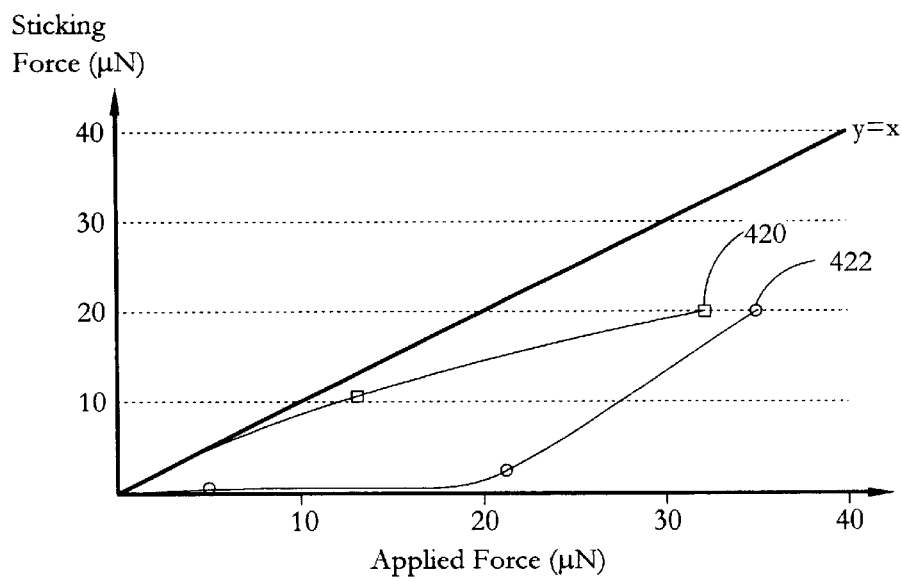
FIG. 4 shows stiction force values for two Au—Au contact surfaces, according to an embodiment of the present invention.

FIG. 4 shows measured stiction force data illustrating the dependence of stiction force on applied force for two Au—Au contacts: a contact between two unetched Au surfaces, and a contact between an unetched Au surface and an etched surface. The data points represented by the squares 420 are for the etched surfaces, while the data points represented by the circles 422 are for the unetched, contact surface. The Au films were sputtered from pure targets in a magnetron sputtering system. The unetched surfaces were as-deposited. The etched surface was etched in an acetic acid/hydrogen peroxide mixture. Etching cleaned the Au surface and made it more prone to stiction, as shown. Cleaning the Au surface of organic and other contaminants by etching can facilitate microwelding, and thus increase the stiction force required for a given applied force.

Apparatus 20 is preferably made by modifying a conventional, commercially-available atomic force microscope (AFM) as described below. A conventional sharp-tip AFM cantilever is replaced with a cantilever structure having a flat or rounded contact surface in electrical communication with the acquisition electronics of the apparatus. The cantilever structure can be kept connected to the acquisition electronics, rather than grounded. A voltage or current meter can be connected to the chuck and arm as to as measure a voltage or current indicative of the contact resistance values of interest. For the preferred design shown in FIG. 1-A, the hard inner core of spherical end piece 40 is preferably epoxied to the inner part of arm 38 using a non-conductive epoxy. A suitable cantilever having an epoxied ball at its end can also be obtained commercially, for example from Veeco/Digital Instruments, Santa Barbara, Calif. The resulting assembly is mounted into a vacuum system, for depositing conductive coating 44 over the assembly. Conductive coating 44 can be deposited by ion beam deposition, sputtering (physical vapor deposition), chemical vapor deposition (CVD), electroplating, dip-coating, or other such methods.

In a present implementation, coating 44 is deposited by ion beam deposition. FIGS. 5-A and 5-B illustrate schematically the preferred assembly mounting geometry employed for the deposition of coating 44 by ion beam deposition. FIG. 5-A shows member 26 before the deposition of coating 44, while FIG. 5-B illustrates member 26 after the deposition of coating 44. The arrows 80 denote the direction of motion of the coating material toward member 26. The interface area along which end piece 40 and arm 38 form a most acute angle is shown at 82. As shown in FIGS. 5-A–B, end piece 40 can be attached to arm 38 along a major longitudinal surface of arm 38, rather than along the transverse end surface of arm 38.

As illustrated, upper member 26 is mounted within the deposition vacuum system such that end piece 40 does not shield the acute-angle interface area 82 from the source of coating material. Allowing end piece 40 to shield interface area 82 can lead to a suboptimal electrical connection between the coating area covering end piece 40 and the coating area covering arm 38. Preferably, upper member 26 is positioned such that interface area 82 squarely faces the source of coating material. Such a positioning corresponds to an acute angle between the coating deposition direction illustrated by arrows 80 and the surface of arm 38 facing the source of coating material. In a present implementation, the acute angle is preferably between 30° and 60°, in particular about 45°.

The above-described systems and methods allow performing contact resistance and stiction measurements under conditions similar to those in microswitches suitable for use in fingerprint recognition microswitch arrays, or other microswitches subject to similar forces and operating conditions. Although AFM devices have found multiple applications, conventional AFM devices are typically used to profile surfaces with high resolution. For such applications, typical AFM tips are very sharp and are operated under ultra-low force conditions. Conventional AFM tips commonly end in a sharp point having a size of tens to hundreds of nanometers. Many developments in AFM have focused on improving the sharpness of the AFM tip, in order to improve the resolution of the device as it scans surfaces of interest. Such ultra-sharp tips are ordinarily not suitable for performing contact resistance or stiction measurements for typical microswitches. Moreover, typical AFM tips are made of insulating materials such as diamond, silicon, or silicon nitride. Consequently, a conventional AFM device is preferably modified as described above in order to perform contact resistance and/or current-dependent stiction measurements.

AFM devices have also been used to characterize electrical properties of samples of interest. In U.S. Pat. No. 6,208,151, Thomas et al. describe an AFM having a conductive sharp tip for mapping voltage gradients in a planar sample. Current is injected from the tip into the sample, and voltages in the sample plane are measured using a voltmeter. The contact resistance between the tip and the sample can be a nuisance in the measurements described by Thomas et al., and its effects are compensated for by injecting constant current into the sample. In U.S. Pat. No. 5,723,981, Hellemans et al. describe employing a sharp tip for measuring voltages across a biased semiconductor device. Applying a high force for the measurement minimizes the effect of any contact resistance on the voltage measurements. In their article "Lateral and Vertical Dopant Profiling in Semiconductors by Atomic Force Microscopy using Conducting Tips," *J. Vac. Sci. Tech. A*, 13 (3):1699–1704, May–June, 1995, De Wolf et al. describe a method of determining the spatial distribution of charge carriers in semiconducting structures using an atomic force microscope. A sharp conductive tip is scanned across a sample, and the local spreading resistance of the sample is determined from the measured data. The references cited above focus on determining electrical properties within a single sample, rather than measuring contact resistances or stiction force values between two sample surfaces.

Bulk (millimeter-size) measurement devices are not normally capable of controlling the applied force finely enough to allow adequate simulation of expected microswitch operating conditions. Bulk measurement devices may only be capable of applying relatively high forces, and may not be useful in controlling small changes in the applied force. In addition, bulk measurement devices having millimeter-size radii of curvature along the contact surface can be limited in their spatial resolution.

It is apparent that the above embodiments may be altered in many ways without departing from the scope of the invention. For example, an end piece having a cylindrical, ellipsoidal, or other rounded (e.g. non-spherical) contact surface may be used. A curved, non-spherical end piece may be used while maintaining the radius of curvature of the end piece within a desired range along the contact surface. An intermediate conductive structure of surface can be inserted between two electrodes of interest in order to measure a contact resistance of interest. For example, an intermediate gold structure may be placed in contact with a surface of interest (e.g. a chromium-oxide surface), and a second gold electrode may be brought into contact with the gold structure. It is understood that other dimensions and materials can be suitable for use with the present invention. Further, various aspects of a particular embodiment may contain patentably subject matter without regard to other aspects of the same embodiment. Still further, various aspects of different embodiments can be combined together. Accordingly, the scope of the invention should be determined by the following claims and their legal equivalents.

What is claimed is:

1. A method of testing, comprising:

performing an atomic force microscopy measurement to obtain a contact resistance value between a pair of thin films when the pair of thin films contact with a first controlled force applied to at least one of the pair of thin films; and performing another atomic force microscopy measurement to obtain a current-dependent stiction force value between the pair of thin films after the pair of thin films are brought into contact with a second controlled force applied to at least one of the pair of thin films.

2. The method according to claim 1 further including the step of employing the contact resistance value and the current-dependent stiction force value to determine whether a combination of a first material used for one of the pair of thin films and a second material used for another of the pair of thin films will be useable for an application of interest.

3. The method according to claim 2 wherein the step of employing determines whether the combination will be useable as contact materials for a microswitch.

4. The method of claim 3 wherein the step of determining determines whether the microswitch is usable in a fingerprint sensing array, the method further comprising:

determining an expected sensing force acting on the microswitch during an operation of the microswitch in the fingerprint sensing array, and wherein the step of performing the atomic force microscopy measurement uses the expected sensing force as the first controlled force.

5. The method of claim 3 wherein the step of determining whether the microswitch is usable in a fingerprint sensing array, the method further comprising:

determining an expected impact force acting on the microswitch during an operation of the microswitch in the fingerprint sensing array, and wherein the step of performing the another atomic force microscopy measurement uses the expected impact force as the second controlled force.

6. The method of claim 1 wherein the first force is different from the second force.

7. The method of claim 1 wherein the step of performing the atomic force microscopy measurement measures a plurality of contact resistance values between the pair of thin films at a first plurality of forces.

8. The method of claim 7 wherein the step of performing the another atomic force microscopy measurement measures a plurality of stiction force values between the pair of thin films at a second plurality of forces.

9. The method of claim 7 wherein the step of performing the another atomic force microscopy measurement measures a further plurality of stiction force values between the thin films, each of the further plurality of stiction force values obtained after a different one of a plurality of different electrical currents is passed through an interface where the pair of thin films are in contact each other.

10. The method of claim 1 wherein the step of performing the another atomic force microscopy measurement includes passing a current higher than 5 $\mu$A and lower than 100 $\mu$A through an interface where the pair of thin films contact each other using the second controlled force.

11. The method of claim 1 wherein the first controlled force is lower than 1 mN.

12. The method of claim 11 wherein the first controlled force is between 10 $\mu$N and 100 $\mu$N.

13. The method of claim 1 wherein the second controlled force is lower than 200 mN.

14. The method of claim 13 wherein the second controlled force is between 20 $\mu$N and 1 mN.

15. The method of claim 1 wherein the second controlled force is at least an order of magnitude greater than the first controlled force.

16. The method of claim 1 wherein each film in the pair of thin films has a thickness not exceeding about ten microns.

17. The method of claim 1 wherein each of the steps of performing the atomic force microscopy measurement and performing the another atomic force microscopy measurement are performed with a first of the pair of thin films disposed on a substrate and a second of the pair of thin films disposed on a rounded piece.

18. The method of claim 17 wherein the first of the pair of thin films is disposed on a planar substrate.

19. The method according to claim 17 wherein each of the steps of performing the atomic force microscopy measurement and performing the another atomic force microscopy measurement include moving the rounded piece to contact the substrate and obtain the pair of thin films that are in contact with each other.

20. The method of claim 1 wherein a first material of the pair of thin films comprises an alloy.

21. The method of claim 1, further comprising the step of performing, prior to the steps of performing the atomic force microscopy measurement and performing the another atomic force microscopy measurement, a parasitic resistance measurement after the pair of thin films are brought into contact with a calibration force applied to at least one of the pair of thin films, the calibration force being at least an order of magnitude higher than the first controlled force.

22. The method of claim 1 wherein at least one of the pair of thin films comprises a multilayer film.

\* \* \* \* \*